United States Patent [19]

Marwick

[11] 4,121,971
[45] Oct. 24, 1978

[54] PULSED NEUTRON SOURCE

[76] Inventor: Edward F. Marwick, 5149 W. Morse, Skokie, Ill. 60076

[21] Appl. No.: 810,894

[22] Filed: Jun. 28, 1977

Related U.S. Application Data

[63] Continuation-in-part of Ser. No. 544,178, Jan. 27, 1975.

[51] Int. Cl.² ............................................. G21C 1/00
[52] U.S. Cl. ........................................ 176/39; 176/9; 176/DIG. 1
[58] Field of Search ............... 176/1, 3, 9, 39, DIG. 1

[56] References Cited

U.S. PATENT DOCUMENTS

| 3,385,759 | 5/1968 | Bettis et al. | 176/DIG. 1 |
| 3,921,405 | 11/1975 | Roseiszewski | 176/9 |

FOREIGN PATENT DOCUMENTS 1,126,037  3/1962  Fed. Rep. of Germany .... 176/DIG. 1

OTHER PUBLICATIONS

Exploding Reactors for Power by Edward F. Marwick, (1/27/73), Julia Marwick Books, 320 Happ Road, Horthfield, Ill., 60093, pp. 1–40.

Primary Examiner—Samuel W. Engle
Assistant Examiner—S. A. Cangialosi
Attorney, Agent, or Firm—Joel D. Talcott

[57] ABSTRACT

A system for producing neutron pulses seriatim in which a smaller, high velocity, sub-critical, downward traveling slug intercepts a larger downward falling sub-critical target-mass, both of which have a portion of higher concentration in fissile materials. The combined masses are more than prompt-critical and the resulting neutron and energy pulse is contained within a large pressure vessel. Spray of mostly sodium slurry protects the walls of the vessel from the effects of the neutron and energy pulse and absorbs the energy and neutron excess of the energy-neutron pulse. Heated slurry is drained from the pressure vessel to provide useful heat energy and neutron irradiated materials. Precipitated materials and sodium are used in the fabrication of both the slug and target-mass.

14 Claims, 4 Drawing Figures

PULSED NEUTRON SOURCE

This is a continuation-in-part of U.S. Patent Application. Ser. No. 544,178 filed Jan. 27, 1975 by Edward F. Marwick and Nis H. Juhl.

This invention pertains to a system for producing neutron pulses, neutron irradiated materials and useful thermal energy by bursting seriatim a combined assembly of a falling target-mass and a more rapidly downward moving slug, both of which by themslevves contain sub-critical masses of fissile and fertile actinides. When these objects combine, the resulting configuration is more than prompt-critical.

The energy and neutron pulse thus produced is contained within a pressure vessel, the walls of which are protected by molten sodium spray containing materials to be neutron irradiated. Such spray becomes a heated working fluid from which useful thermal energy can be extracted.

In the above-identified application, Ser. No. 544,178, two equal size slugs are propelled by helium gas guns and intercept near the center of an ellipsoidal pressure vessel producing an explosion. At the instant of explosion, a generally spherical mass is formed of about 130 kilograms containing about 17% plutonium with over 80% of depleted uranium and surrounded by solid sodium. Within the vessel, about a hundred tons of liquid sodium spray containing actinides in about the same proportions is present in the form of a slurry. Because of the high percentage of plutonium in the actinide-sodium slurry, substantial fissioning will occur therein. It is estimated that reactions produce a net gain of about 29 plutonium atoms from the fissioning of every 100 actinide atoms.

The present invention provides a neutron pulse of about $10^{20}$ to $10^{21}$ neutrons in a time period of less than a millisecond. Such pulses occur about every 8 seconds and the quantity of neutrons which occur at the time other than the time period of a milliseond are less than 10% of the magnitude of such neutron pulses. Such neutron quantities are neutrons in excess of those needed to sustain the neutron-energy burst.

These excess neutrons can be used to irradiate materials in the walls of the pressure vessel, on the inside of the walls of the pressure vessel, within the mostly sodium slurry, within the outer portions of the concurring target-mass and slug, within the centroid portions of the concurring target-mass and slug, and/or some combination thereof.

These neutron bursts are produced when a falling target-mass of about 116 kg concurs with a downward accelerated slug of about 19 kg so that the combined target-mass, accelerated slug and shielding slurry thereabouts is more than prompt-critical. With much more than prompt-criticality there is a very rapid build-up of fast-neutron-fissioning therein and a resulting production of the large neutron burst or pulse. As the accelerated slug enters into an upward-facing opening in the target-mass the combined assembly is surrounded by about one hundred tons of mostly sodium slurry which contains some actinides and fission products from previous neutron producing assemblies. Note that bursts are concurrent with such energy production and are of such short time duration that the accelerated slug and target-mass are both vaporized and the actinides therein are resultingly disbursed as very fine particles within the heated slurry.

Useful thermal energy can be extracted from this heated slurry. Also from the slurry actinide precipitate is obtained which is used for the fabrication of the centroid portion of the target-mass and the front portion of the accelerated slug. In addition, impure sodium is obtained from the slurry and is used for the fabrication of the outer portions of the target-mass and the back portion of the accelerated slug.

In the preferred embodiment of this invention the actinides used therein are a mixture of plutonium rich in Pu-242, neptunium, americium, curium, and other transplutonic actinides. And the neutron irradiated materials therein are the non-fissile isotopes of the actinides therein. Thus, this preferred embodiment is a "burner" of transuranic atoms and a producer of useful thermal energy.

In accordance with this invention, the complex system-means by which the sodium-actinide slurry was either prevented from entering or drained from the bottom slug accelerating means of the aforesaid U.S. Patent Application Ser. No. 544,178 is not necessary. Additionally, only one accelerating means is needed and a slug of much lower mass may be used.

These and other advantages of this invention will be more readily apparent when the following Specification is read in conjunction with the appended drawings, wherein.

In accordance with this invention, energy and neutrons are produced by a nuclear fission burst in a chamber wherein the effects of said burst are attenuated by a spray of liquid droplets. The liquid is collected so that the heat and some of the irradiated actinide materials therein may be extracted therefrom. The liquid is fed into heat exchangers and storage tanks so that from the bottom portions thereof, a slurry having a slightly richer actinide content may be withdrawn therefrom. This slightly richer slurry is separated into "cleaner" sodium and into precipitate. The precipitate and sodium are used to produce the slug and target-mass which, when they concur, produce the burst.

Figure 1:
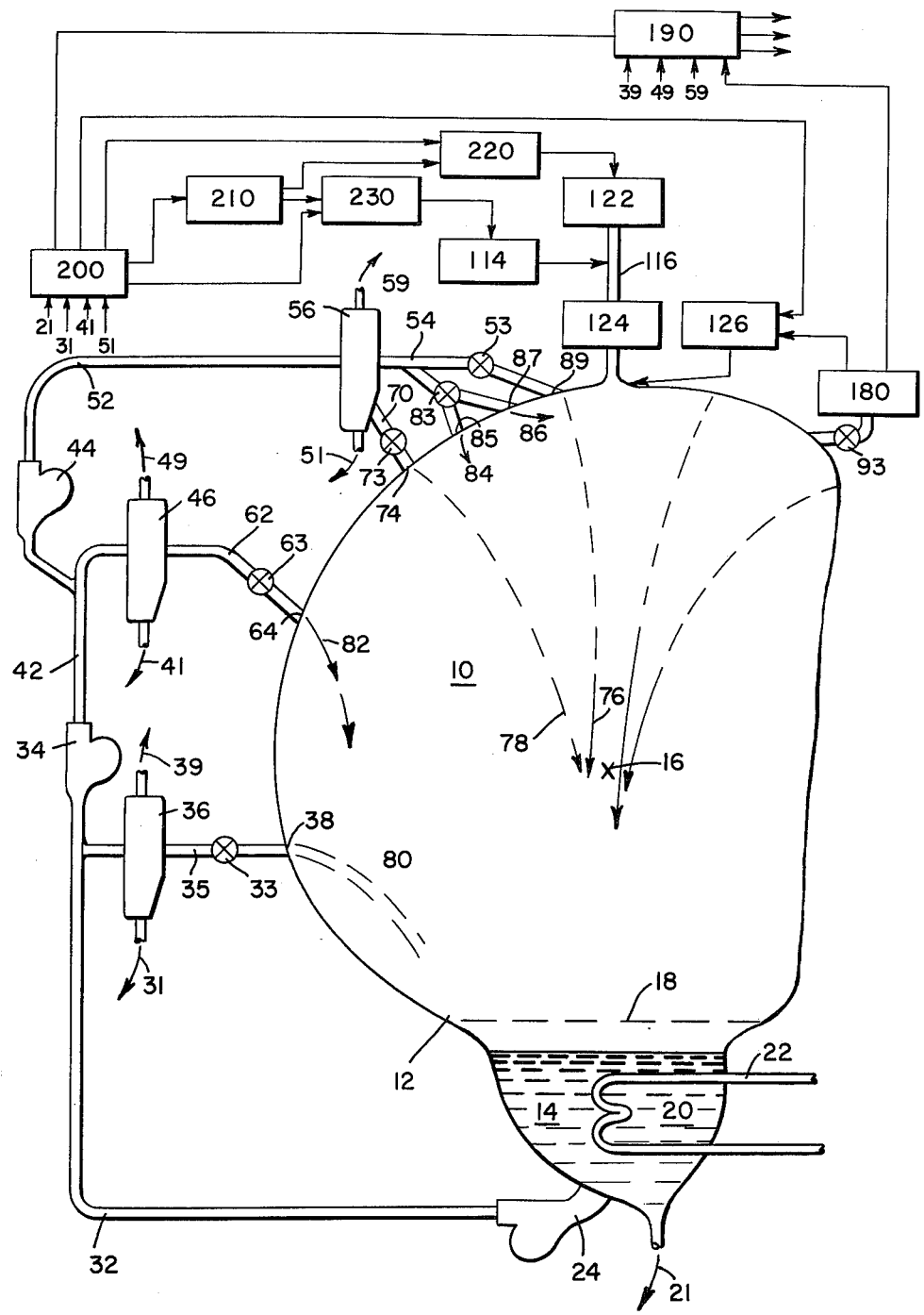
FIG. 1 is a generally schematic, fragmentary sectional view of a neutron pulse and useful thermal energy producing system in accordance with this invention.

Referring now to FIG. 1, there is illustrated a system comprising a pressure vessel 10 which is very roughly spherical having an average diameter of about 20 meters. The pressure vessel 10 has walls 12 constructed of materials capable of withstanding shock-blasts of explosions as well as corrosive effects of heated working fluid. A preferred material for this purpose is steel alloy. Additional or substitute materials will be readily apparent to those skilled in the art and will not be treated in detail here as the invention is not directed to the construction of such a chamber. The walls of the pressure vessel 10 may be on the order of 2 meters thick which would permit them to withstand the shock to be contained. However, by constructing the pressure vessel underground or by other means, the walls 12 may be further reinforced.

In the bottom portion of the pressure vessel 10, the walls 12 are constructed to define a pool 14 containing actinide-sodium slurry which is formed and maintained by bursts in the pressure vessel 10 and by the spray of fluid used to attenuate the bursts, both of which will be described subsequently in detail. Since on the order of 100 cubic meters of slurry arrives in a period of about three seconds after the burst, the minimum diameter of the walls containing the pool 14 should be about eight meters. At the instant of explosion, the surface of the pool 14 is on the order of eight meters from the point of explosion, shown as 16. Since the 100 cubic meters of slurry drains out between successive bursts and the bulk of the slurry is collected in a brief period after each burst, the slurry level will rise to a height shown as 18. Between bursts, the height of the surface of the pool 14 varies about two meters.

The actinide-sodium slurry, which also contains debris from the explosion, contains substantial thermal energy as a result of the burst. To extract this energy, the heated slurry is passed through heat exchanging means 20 which may be of a type utilizing heat withdrawing tubes 22. Of course, it will be understood that any number of suitable heat exchangers may be utilized to extract heat from the slurry. During passage through the heat exchanger 20, the average temperature of the slurry is reduced from about 390° C to about 200° C.

The actinide material in the sodium slurry is in the nature of a suspension. Thus, when the sodium falls into the pool 14, the actinide material begins to settle. At any time, the percent age of the actinide materials toward the bottom of the pool 14 will be slightly greater than that toward the top. This fact is utilized in accordance with this invention to produce a slurry having an enhanced concentration of materials which is transported through a pipe 21 to a slurry processing means 200.

A pump 24 is provided in the lower middle portion of the heat exchanger 20 which pumps sodium-actinide slurry through a pipe 32 into a holding chamber 36 and to a pumping means 34. The pump 34 pumps slurry through a pipe 42 into a holding chamber 46 and pumping means 44. Pump 44 pumps slurry through pipe 52 into holding chamber 56. Holding chambers 36, 46, and 56 are preferably generally ring-shaped, extending completely around the pressure vessel 10. Thus it can be seen that the holding chambers will be capable of containing substantial quantities of sodium-actinide slurry.

It should be noted that if the single pumps 24, 34 and 44 or the pipes 32, 42 and 52 should not be sufficient to accommodate the quantity of fluid which must be pumped prior to each burst, additional pumps and pipes could be provided around the pressure vessel 10 and heat exchanger 20. Also, additional pumps could be utilized within each of the pipes to increase the pumping pressure if necessary in a manner well-known to those skilled in the art. It would probably be best if the pumps are continuously operated during the whole 8 second cycle.

As in the heat exchanger 20, the antinide material will continue to settle after the slurry has been pumped to the holding chambers 36, 46 and 56. Therefore, the richer concentration of actinides in slurry will tend to be toward the bottom of the holding chambers. Bottom openings for extracting this material are in the holding chambers; pipe 31 extends from the opening in chamber 36, pipe 41 from chamber 46, and pipe 51 in chamber 56 to the slurry processing means 200. Suitable controlling means and pumping means (not shown) would also be used in transporting this richer-in-actinide-slurry to the slurry processing means.

As will be readily apparent, the general ring shape of the holding chambers permits each holding chamber to feed a substantial number of nozzles so that the sprays may be established somewhat uniformly around the pressure vessel 10. While valves 33, 53, 63, 73, and 83 will be open only prior to burst, at which time it is desired to have the spray in the pressure vessel 10, the pumps 24, 34 and 44 will generally operate continuously to maintain a sufficient supply of slurry in the holding chambers. By this means, it will be possible to have the desired configuration of spray which may contain in excess of 100 tons of liquid slurry at the instant of bursting.

Slurry processing means 200 is basically a precipitation chamber wherein the actinide is precipitated out as a thick dense slurry which is dried and heated up in the means 210. Some of this heating will be due to radioactive decay which will augment other heating means. Such heating will vaporize off most of the rubidium and cesium (fission $p$ products) before the sodium (vapor pressure of 10 mm at 549° C) is vaporized off. The heated "dried" precipitate which contains some fission products in with the actinides can then be used in the manufacturing means 220 and 230.

With about 0.1% by atoms of actinides in a slurry which has a total mass of about 100 tons, about 1.04 tons is actinides. Since about 0.027 tons of precipitate is needed for the target-mass and slug for an explosion, only about 2.6% of the actinide in the slurry needs time to precipitate in each cycle. If it is found that too much time is needed to obtain this slight quantity of precipitation by just having it stand, there are at least three means by which such concentrating of precipitate could be accelerated:

(1) Centrifuging — There are centrifuges now known to those skilled in the art which can continuously handle such materials as molten sodium with actinides slurry.

(2) Evaporation of the sodium - near vacuum distillation — For this the slurry will be heated to about 550° C and the nearly pure sodium will be vaporized off.

(3) Addition of a coagulating or precipitating-accelerating material to the slurry — Possible materials could be mercury, cadmium, or zinc. Note that such materials could be vaporized off from the precipitate. (Cadmium has a vapor pressure of 40 mm at 553° C while zinc has a vapor pressure of 10 mm at 593° C.)

Figure 2:
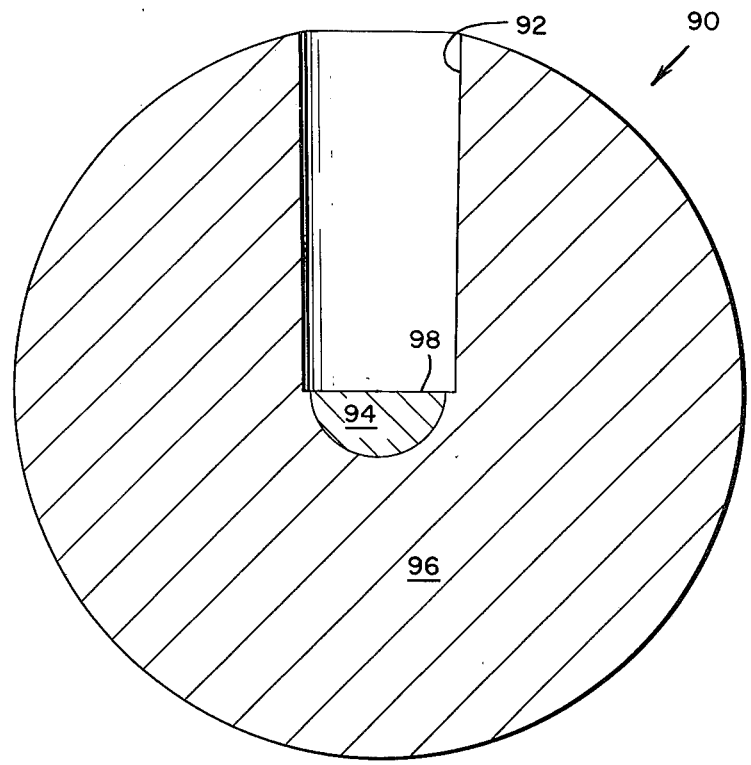
FIG. 2 is a cross-sectional view of a target-mass for use in the system of FIG. 1.

FIG. 2 is a cross-section of the target-mass 90 which is generally spherical in shape and has a generally cylindrical open cavity 92 therein. The radius of the target mass 90 is preferably about 30 cm. With the exception of a hemispherical volume 94, the body 96 of this target-mass 90 is formed of cast impure sodium from means 200. The hemispherical volume 94 has a flat surface 98 forming most of the bottom of the cavity 92 and a radius of about 7 cm. The volume 94 is preferably formed of actinide alloy from the means 210.

The shape of the cavity 92 is such that its diameter at the blind end is 14.4 cm. It quickly tapers so that the diameter at a point only 2 mm removed therefrom is 14.8 cm. Further upwards the tapering is much less so that the outermost diameter is about 16 cm.

Figure 3:
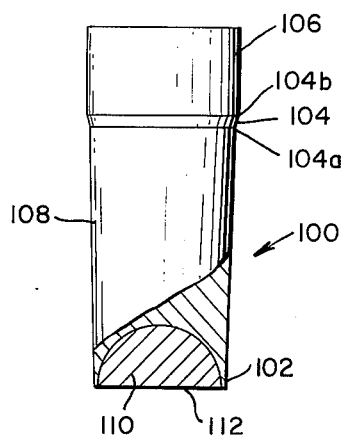
FIG. 3 is a partially sectioned plan view of a slug for use in the system of FIG. 1.

The fabrication of the target-mass 90 may be easily accomplished in a target-mass manufacturing means 230 by those skilled in the art of casting sodium. Into the body 96 of cast sodium can be pressed the hemispherical volume 94, which may be formed of cast or forged actinide alloy from means 210. Since there is much radioactive decay of both actinides and fission products within this target-mass 90, it should be dropped within a minute or so after its fabrication. Since it is preferably accelerated only by gravity, there is little need for structural strength. The fabrication of this target-mass 90 and of an accelerated-slug 100 which is shown in FIG. 3 are quite similar to the fabrication of slugs which are disclosed in the aforementioned applications, Ser. No. 544,178 and my application Ser. No. 582,141, filed May 30, 1975.

The accelerated slug 100 is formed in a slug manufacturing means 220 and is designed to "fit" into the cavity 92 with a couple of millimeters to spare. The bottom portion 102 of the slug 100 is circular with a diameter of 14 cm. The slug is tapered for about 32 cm to a shoulder 104 which is about 4 cm long. A lower edge 104a of the shoulder 104 preferably has a diameter of 15 cm and an upper edge 104b has a diameter of 16 cm. A tope portion 106 is preferably cylindrical in shape with a uniform diameter and a length of about 8 cm.

The body 108 of the accelerated slug 100 is preferably formed of cast sodium from the means 200 and 210. A hemispherical portion 110 is substantially identical to the volume 94 of the target-mass 90. A flat surface 112 forms a central portion of the bottom surface of the slug 100 and has a radius of 7 cm. The top portion 106 of the slug is formed of solid sodium.

About 27 kg of actinide alloy are used for the central portions 110 and 94 of what becomes a bursting assembly. The surrounding portions 96, 106 and 108 are of about 110 kg of cast impure sodium.

A burst is produced in the pressure vessel 10 by dropping a target-mass 90 and propelling a slug 100 so that it catches the falling target-mass 90 and is propelled into the cavity 92 to produce a more than prompt critical mass. The nucleonics of this energy-neutron burst will be discussed subsequently. It is very important that target-mass 90 reach the point of bursting 16 properly oriented so that the cavity 92 is aligned in the direction from which the slug 100 is being propelled.

The propulsion of the target-mass 90 to the point of bursting 16 with the proper orientation may be accomplished by several alternative means such as cutes or suitable cable lowering apparatus. However, a relatively sure and simple means of accomplishing this objective comprises moving each target-mass 90 from means 230 to a target dropping means 114 (FIG. 1) which includes sufficient mechanical apparatus to insert the target-mass into an entry tube 116 directly above the point of explosion 16 in the pressure vessel 10.

Figure 4:
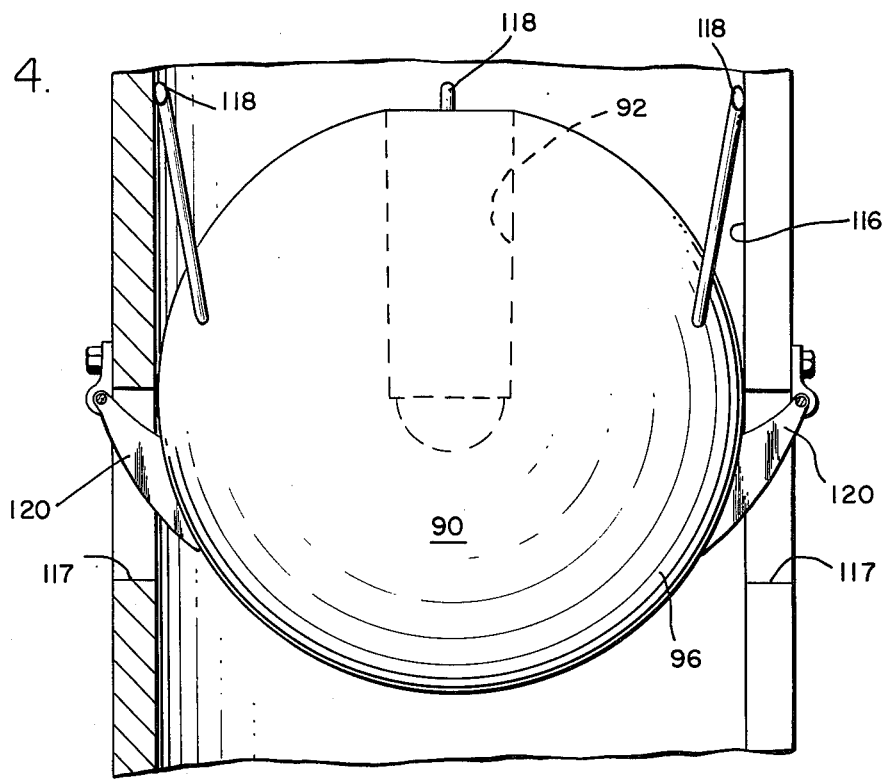
FIG. 4 is a cut-away view of a target mass dropping means for the system of FIG. 1.

Referring now to FIG. 4, a portion of the entry tube 116 is illustrated just below the point of entry at which the target-mass 90 is inserted. The target-mass 90 is shown and properly oriented with the cavity 92 pointed upward. This alignment is maintained by the provision of alignment struts 118 on the target-mass 90, the outer ends of which engage the wall of the entry tube 116. The struts 118 may be inserted into the body 96 of the target-mass 90 during its formation.

A plurality of engagement tabs 120 are preferably mounted in the wall of the entry tube 116 to hold the target-mass 90 at its desired height. The engagement tabs 120 are mechanically movable by any convenient means into recesses 117 in the wall of the entry tube 116 to permit the target-mass 90 to fall.

Positioned at the upper end portion of the entry tube 116 is a slug accelerating means 122 (FIG. 1) which receives slugs from the slug manufacturing means 220 to be propelled into the pressure vessel 10. The slug accelerating means 122 preferably comprises a gun which, in a manner well-known to those skilled in the art, utilizes a compressed gas, such as helium, to accelerate the slug 100 through a barrel to the desired velocity. The slug is projected downwardly through the entry tube 116 into the pressure vessel 10 so that it will be propelled into the upwardly directed cavity 92 of the target mass 90. By controlling the pressure of the propelling gas and properly regulating the times of dropping of the target mass 90 and the firing of the slug 100, the slug can be inserted into the cavity 92 with the necessary velocity to produce a burst at the point 16. The relative velocities of the target mass 90 and slug 100 at impact can be regulated so as to also control the magnitude of the resulting neutron and energy output.

After the target mass 90 has been dropped and the slug 100 propelled toward it, a shutter assembly 124 in the entry tube 116 is closed so that target dropping means 114 and the slug accelerating means 122 will be shielded from the neutron and energy burst. The shutter assembly may consist of any suitable mechanical blocking structure and is opened again shortly before the next target mass 90 is to be dropped. Closing time is, of course, important for the shutter 124 and it may thus be desirable to use a type which closes radially as that closure begins after the target mass 90 has passed. The shutter need only leave an opening slightly larger than the outer diameter of the slug 100 to permit it to pass, closing thereafter to protect the target mass dropping means 114 and slug accelerating means 122. A spraying system 126 is also provided to quickly introduce a large quantity of spray beneath the shutter assembly 124 so that it is protected from any shock effects of the bursting. Because operation of the spray 126 is timed so that no spray travels beneath the entry tube 116 until after the passage of the slug 100, the spraying system 126 will not interfere in any way with the product of a bursting at the point 16 in the pressure vessel 10.

In operation of the neutron pulse producing system of this invention, the accelerated slug 100 is almost completely inserted into the cavity 92 before the combined assembly becomes more than prompt-critical. If the slug 100 is traveling 300 meters per second faster than the falling target-mass 90, they will approach each other at a rate of about 0.3 mm per microsecond. Thus, for a period of many microseconds, the assembly will be critical but not more than prompt-critical. Since neutrons will be produced by the spontaneous fissioning of actinides such as $Pu^{240}$ and some delayed neutrons will come from fission products, it can be expected that at the instant the combined assembly becomes more than prompt-critical there will be as many as a million fissions per generation.

As the rate of fissioning rapidly increases after the assembly becomes more than prompt-critical, the hemispherical volumes 94 and 110 are still approaching each other so that the slight decrease in criticality due to the "heating" of the assembly is more than balanced by the increase in criticality due to the continuing concurrence of the masses. Of course, after a couple of microseconds, the "heating" rate becomes so great that the centroid portion of the assembly becomes vaporized and the overall criticality begins to decrease. Simple calculations indicate that over 90% of the fissionings which constitute the bursting take place after such centroid portion vaporization.

In the fissioning of actinides, the spectrum of neutrons formed ranges in energies from less than a million electron volts to many millions of electron volts. Those more energetic neutrons will fission all of the different actinide isotopes including those which are not fissionable by "slow" neutrons. This "fast fission bonus" is a major reason for effectiveness with the system of this invention.

Even though much fissioning takes place in the approximately spherically shaped combination of volumes 94 and 110 where the diameter is about 14 centimeters, it is probable that many of the neutrons formed by fissioning within the "sphere" 94–110 will leave and be reflected back to 94–110 by the volumes 96 and 108.

Likewise some of the neutrons fission-born within the "sphere" 94–110 will leave the combined assembly. Some of such neutrons will be reflected back by atoms of the surrounding slurry and will re-enter the "sphere" 94–110 as much slower neutrons. Others will be absorbed by atoms of the surrounding slurry. Much of such absorption will result in fissioning and some neutrons born of such fissioning will enter the "sphere" 94–110. If the "$k$" of the slurry is about 0.50, from each net neutron entering said slurry, there will be about one and one-half neutrons that will be absorbed by an atom therein.

Of course some neutrons born either within the "sphere" 94–110 or within the slurry will travel outwardly to the walls 12 of the pressure vessel. There are many ways by which these neutrons can be utilized:

There can be slabs along the walls to absorb neutrons and to cause some neutrons to be reflected back into the slurry. Such slabs are disclosed in my U.S. Patent Application Ser. No. 582,141, filed May 30, 1975 and now abandoned.

There can be neutron absorbing and heat absorbing slurry circulating within the walls as are disclosed in the previous identified U.S. Patent Application Ser. No. 544,178.

Also, there can be neutron absorbing means as are disclosed in my U.S. Patent Application Ser. No. 466,263, filed May 2, 1974 and now abandoned, wherein lithium fluoride is neutron irradiated to produce both helium and tritium.

Likewise, there can be neutron absorbing means as are disclosed in my U.S. Patent Application Ser. No. 795,106 filed May 9, 1977 wherein cobalt is irradiated.

Even after the energy of the bursting has driven the combined assembly apart so that it is no longer critical, there will still be prodigeous quantities of fissioning due to delayed neutrons. Note that if the "$k$" is about 0.99, there will be a hundredfold multiplication of fissioning. There will be about 1 delayed neutron per 200 "prompt" neutrons.

A bursting with an energy of about $14 \times 10^9$ joules causes about 2 tons of spray as well as all the matter in the combined assembly to be vaporized. Even though the assembly will be so vaporized and heated that its material and that of the nearby spray will be somewhat in the form of a plasma, there will still be some "inertial" confinement for an additional time period roughly on the order of a millisecond.

It may be desirable to alter the chemical content of some of the reaction components when the system is to be initially put into service. One possible way that this reactor system can be started up is to add powdered actinide to the sodium that is to be used in the spray systems, to construct the volumes 94 and 110 with a radius of around 6.8 cm since there will be a minimal quantity of fission products therein. The exact radius will depend upon the isotropic concentrations, etc. The combined assembly should have the same specific property of becoming prompt-critical when the surfaces 98 and 112 are about a half centimeter apart.

After a hundred or so burstings, the portions 94 and 110 could be fabricated from precipitate.

At the instant of the bursting, on the order of 1.1 tons of actinides with about 100 tons of sodium will be contained in the pressure vessel 10. About 0.027 ton is fabricated in the accelerated slug and target-mass while the rest is in the spray-slurries. With each burst there is the "production" of about 0.2 grams of fission products, most of which will become part of the slurry. Perhaps about half or about 0.1 gram of fission products per bursting will become mixed with the actinide which is formed into the portions 94 and 110.

Of course such fission products will reduce the effectiveness of the bursting assembly but the system is so designed to compensate for such loss of effectiveness and for the loss of fission products to neutron absorption. Note that after this system has operated for several months and the concentration of fission products within the portions 94 and 110 is on the order of say 10% the precipitate can be processed for purification of these fission products. Likewise the sodium slurry will have a build-up of soluble fission products therein.

This invention does not concern itself with the precise methods of such purifications for such art is well developed. The practitioner of this invention will know of the lower boiling points of the alkali metals which are fission products such as cesium and rubidium and of the low boiling points of such fission products as barium (1140° C) and strotium (1150° C). Such matters and the use of dissolving metals such as bismuth were disclosed in my U.S. Patent Application Ser. No. 655,062 which was filed Feb. 4, 1976.

This preferred embodiment is of a neutron source whose primary purpose is the "burning up" of high Pu-242 plutonium with other trans-uranic actinides. Such burning up also will produce useable thermal energy. With a burst every 8 seconds, there will be about 2,000,000 watts of thermal power produced. About 4,000,000 bursts per year will "consume" about 4,000,000 800 kg of actinides.

Within the "sphere" 94–110 the average neutron therein that was fission-born therein will have an energy of about $10^6$ ev and will, if it is absorbed therein, most likely cause a fissioning of any of the actinides therein. Note that such fast neutron fissioning will produce more neutrons per fission that does slower neutron fissionings. On the other hand, those neutrons that are moderated by collisions with atoms of sodium either in the portions 96 and 108 or in the slurry will tend to, on the average, be absorbed by $(n,\gamma)$ reactions. Most of such reactions will produce fissile materials i.e. $Np^{237}$ $(m,\gamma)Np^{238}$, $Pu^{240}$ $(n,\gamma)$ $Pu^{241}$, etc. However, many of these thusly produced fissile materials have a short half-life and will most probably decay into a non-fissile to slow neutrons isotopes such as $Np^{238}$ (2.1 days) to $Pu^{238}$; $Pu^{243}$ (5 hrs.) to $Am^{243}$; $Am^{244}$ (25 minutes) to $Cm^{244}$; etc.

It should be understood that the bursting is not entirely that of a very fast neutron fissioning configuration. There are also much fissioning by epi-thermal and thermal neutrons therein.

An abbreviated sequence of operational procedures of the practice of this invention could be as follows: (all times are with instant of explosion as 0.0 seconds)

- −4.0 shutter assembly 124 opens, target mass is moved into position for dropping.
- −1.7 target-mass is dropped.
- −1.6 valves 53 are opened, sprays 76 start on a trajectory which travels about 40 cm from the center of the bursting. Some of the sprays 76 will meet other sprays 76 at about the instant of bursting but about a meter below the center of the bursting. Thus, the bottom portion of the chamber is shielded from the effects of the bursting. Closing of shutter assembly 124 is initiated.
- −1.5 valves 73 are opened; this releases sprays 78 which have a trajectory which comes within about 1 meter of the center of the bursting.
- −1.4 valves 73 are closed; this stops sprays 78.
- −1.3 valves 53 are closed; this stops sprays 76.
- −0.8 valves 63 and 33 are opened; this releases sprays 82 and 80 which act to protect the middle and bottom portions of the chamber's walls.
- −0.4 valves 73 are opened; this releases sprays 84 and 86 which act to protect the upper portions of the chamber's walls.
- −0.1 valves 93 are closed (to vapor condensing means 180), valves 53 and 73 are opened (providing some sprays near the chamber's walls at the instant of bursting).
- −.06 slug passes through the shutter assembly 124, spray system 126 opens its valves to provide spray for the protection of the shutter assembly.
- −0.0 bursting, valves 53, 73, 63, 33 and valves of spray system 126 are closed.
- +3.0 valve 93 is opened; any vapor remaining in chamber goes into vapor condensing means 180. This includes helium (from the slug accelerating means), fission product gases such as Xenon and krypton, and volatile fission products such as cesium and rubidium, and some sodium vapor and some debris from the bursting.

It will be readily understood that a greater number of sprays and valves would be utilized in the system than are shown in FIG. 1. The overall spray pattern is such that over half of the sprays 76 and 78 are towards the centroid portion of the chamber, and the remaining spray is towards the chamber's walls. The overall effect of such a system of sprays is that the shock-blast effects, neutrons, and energetic photons from the bursting are mostly attenuated before they reach the chamber's walls.

For example, if, at the instant of explosion about 56 tons of spray are within 3 meters of the center-point of the explosion, the average density of spray is about half that of all-liquid spray. In terms of shielding this is about equivalent to 150 cm of all-liquid spray. Because of the presence of about 0.1% actinides within the spray there would be little high-energy phtons (x-rays and/or gamma rays) escaping through this dense spray. Likewise, many neutrons will not be able to escape through this dense spray since by collisions with the sodium and actinide atoms of the spray many neutrons will be so de-energized that capture by the different actinide isotopes becomes most probable. Of course, there will be some fissioning of fissile actinides such as $Pu^{239}$, and $Pu^{241}$ by neutrons that have been somewhat slowed down by collisions with atoms of the sprays. Many of these fission-produced-in-spray neutrons will travel beyond the dense spray near the center of the bursting.

In the above sequence, the times for accelerating the accelerated slug 100 were not given. If the accelerated slug's final velocity when leaving the accelerating means 122 is 300 m/sec and the rate of uniform acceleration is 300 m/sec$^2$, then the time for acceleration is 1 second and the length of the distance for acceleration is 150 meters. That means that the acceleration of the accelerated-slug would begin at about −1.06 seconds.

Although at about 0.1 second after the explosion perhaps as much as 2 tons of sodium vapor, sodium gas, or sodium as plasma will exist within the central portions of the pressure vessel 10, it is probable that within a couple of seconds most of that sodium will have condensed on the cooler spray-droplets and that within say 5 seconds almost all of that sodium will have fallen into the pool 14.

Of course, there could be either a longer or a shorter period for the operation of this reactor's cycle. If a shorter period is used, the pumping, heat-exchanging, and processing means would be enlarged.

The vapor removed from the chamber 10 when the valve 93 is opened is passed through the vapor condensing means 180 to condense any sodium and pass it to the spray means 126 for reuse in the chamber. The remaining gases are transmitted to a vapor processing means 190 where, along with gases transported through pipes 39, 49 and 59 from the reservoirs 36, 46 and 56, respectively, the constituents are separated and permitted to decay into more stable isotopes for removal and use outside the system.

It is possible that this invention might be practiced wherein the accelerated slug has a much smaller mass. For example, the average diameter of the slug might be on the order of say 9 cm. Of course, there would need to be changes in the dimensions of the open cavity 92 but it should be understood that the actinide alloy need not be divided equally between the target-mass and the accelerated slug. The advantage of a lighter accelerated slug is that there would be a resulting smaller accelerating means. Even though the velocity of the accelerated slug might have to be as much as 20% more if the slug has a mass of but one-third as much, the energy to accelerate it is less than half as much as heretofore disclosed.

It is also possible that this invention might be so modified that it is used for the production of actinide slurry. Such slurry of fissile and fertile actinides with sodium or lithium might be used in reactors wherein the primary purpose of the slurry is to breed fissile isotopes, to be a means of withdrawing thermal energy from a reactor system, or means of controlling the "$k$" of a critical fissioning reactor.

F. L. Bett, et al of the Australian AEC in E69 and E70 have disclosed "Studies of Uranium-Sodium Suspensions" wherein "powder" with a maximum diameter of 5 microns of .76% atomic percentage needed 10% to 15% more pumping power than pure sodium. After many weeks of velocities of 8.3 feet/second and temperatures of about 625° C, there was no evidence of uranium slintering together.

To use the system of this invention for the manufacture of an actinide-alkali metal slurry, the following steps would be advisable:

(1) Drain all the slurry that was used in the system as heretofore disclosed from the chamber, storage cylinders, and piping of the system. A flushing out by more-or-less pure alkali metal may even be necessary. The flushing alkali metal could also be added to the alkali metal with the regular slurries used in the preferred disclosed system. Pure alkali metal is now placed within the reactor system.

(2) The target mass dropping means and any "trap door" shielding devices would be made large enough so that roughly 10 tons of target-mass could be handled and dropped. (Portion 96 would be of depleted uranium with an outside diameter of a meter).

(3) The centroid portion of the combined explosive could be made of say 99 plus % plutonium. This means that the portions 94 and 110 will be smaller than in the heretofore disclosed embodiment. The quantity of near pure plutonium will be on the order of about 10 kg; the diameter of the sphere of 94-110 is about 10 cm.

(4) After about twenty cycles, the accumulated slurry is drained from the reactor and transported to a point of use. Note that while these cycles are being done there might be some slight precipitation of actinides which can be withdrawn by drains 21, 31, 41 and 51. Thus, the manufactured slurry will be of only very small particles. The larger particles, on the other of one micron in size, will have been precipitated out. Such precipitate can be used in fabrication of a target-mass.

Assume that for the above twenty cycles some 200 tons of sodium was used as the working fluid and the target mass was mostly depleted uranium with say 0.2% $U^{235}$. The resulting slurry is 200 tons of sodium, about 200 tons of depleted uranium and about 200 kilograms of plutonium. Hence, the percentage of plutonium in the total actinides is about 0.1%. This resulting slurry could be used as a heat removing working fluid where there is some neutron irradiation, such as near the "first wall" of a fusion reactor. In the above illustration even though the depleted uranium is about 50% by mass, it is less than 9% by atoms.

It is also possible that the same type of slurry manufacturing system can be used for the manufacture of a thorium-sodium slurry. Perhaps in such a system the use of concentrated $U^{233}$ could be used in place of plutonium. Such concentrated $U^{233}$ could be obtained from the processing of an irradiated mixture of thorium, protactinium, and uranium in which the thorium, protactinium, and uranium have quickly been separated out. After several months, the reprocessing of protactinium will yield a nearly pure $U^{233}$. Also, after several months the reprocessing of thorium will yield a rich concentration of $U^{234}$.

To minimize the production of undesirable $U^{232}$, the core of fissile material can be surrounded by about one cm thickness of $U^{234}$ which is highly fissionable to fast neutrons.

Rather than having sodium as the alkali metal, lithium metal could be used. Of course, with lithium there would be the production of tritium when the resulting slurry is irradiated.

Of course, there are other slurries which could be produced by the practice of this invention, such as magnessium alkali metal slurries.

With modifications of various parameters, this invention could be practiced with either explosions of larger magnitude or with explosions of lesser magnitude. An advantage of explosions of greater magnitude is that a doubling of energy will necessitate only a very slight increase in fabrication and processing expense or a slight increase in slug accelerating expense. Of course, with a larger explosion, more pumping and spraying is needed. Also, a larger containing chamber would be required.

For example, an alternate embodiment of this might have a chamber with twice the diameter of the preferred embodiment and walls say three meters thick. The diameters of the target-mass and slug could also be doubled with a doubling of the diameter of the "sphere" 94-110. Also, eight times as much slurry could be used and the slurry could be about 0.2% by atoms of actinides.

In this alternate embodiments the actinide would be about a quarter plutonium and most of the balance is of depleted uranium (U238). With a bursting every ten seconds, there would be the production of about 13 million watts of thermal power and a net breeding of plutonium.

The various parameters of this invention can be further varied as the practitioner desires. For example, with a larger chamber the actinide in sodium surry could be say 6% plutonium and the core of the assembly could be over 99% plutonium while most of the target-mass and slug are of pressed precipitate of 6% plutonium and 99+) depleted uranium. The radius of the target-mass could be say 25 cm wherein the outermost centimeter is of actinides depleted of plutonium. A burst of say $10^{11}$ joules every 10 seconds would yield about 10 million kilowatts of thermal power. An advantage of such a system is that there would be a lesser percentage loss of neutrons due to capture by sodium (peaks at 2.85 kev) since a lesser percentage of neutrons will leave the combined assembly and hence there results a ghigher breeding ratio of plutonium.

It will be readily apparent from the foregoing Specification that other modifications may be made by the artisan to the reactor and method discosed without departing from the spirit and scope of this invention.

I claim:

1. A method of producing neutrons in a containing chamber having an impact point, utilizing a large mass of fissile and fertile actinides and a smaller mass of fissile and fertile actinides, each mass being less than critical, said method comprising the steps of: injecting separately at two different predetermined times said large mass and said small mass respectively;
    causing said large mass to move downwardly in said chamber toward said impact point;
    propelling said smaller mass downwardly in said chamber to overtake said large mass such that the combined masses become more than prompt-critical and produce a neutron pulse at said impact point; and
    introducing liquid spray into said chamber for projecting said chamber and absorbing debris and thermal energy.

2. The method of claim 1 wherein said large mass has a cavity and said smaller mass is shaped for interference fit in said cavity, and wherein:
    said large mass is caused to move downwardly in said chamber with said cavity upwardly directed; and
    said smaller mass is downwardly propelled for insertion in said cavity.

3. The method of claim 2 wherein a segment of concentrated fissile materials is positioned in said large mass at a blind end of said cavity, and a segment of concentrated fissile materials is positioned in said smaller mass at a lower portion, and wherein:

said segments are brought in close proximity when said smaller mass is inserted in said cavity for causing said combined masses to become more than prompt-critical.

4. The method of claim 1 including the step of producing fissile isotopes by the neutron irradiation of fertile isotopes.

5. The method of claim 1 including the step of producing an actinide-sodium slurry wherein over 99% of said actinide is of fertile isotopes.

6. Apparatus for producing intense neutron pulses seriatim, said apparatus comprising:

a containing chamber;

less than critical target mass means of fissile and fertile actinides with a cavity therein having a segment of concentrated fissile materials;

less than critical slug means formed of fissile and fertile actinides for interference fit in said target mass means cavity and having a segment of concentrated fissile materials in an end portion thereof;

means for injecting separately at two different predetermined times said target mass means and said slug means, respectively;

means for dropping target mass means seriatim into said containing chamber with the cavity being upwardly directed;

means for downwardly propelling slug means seriatim toward each of said target mass means for insertion in the cavity for bringing said segments in close proximity such that the combined masses become more than prompt critical; and spray means for protecting said chamber and absorbing debris and thermal energy.

7. Apparatus as in claim 6 wherein said spray means comprises:

means for collecting actinide-sodium slurry at a bottom portion of said chamber;

heat exchanger means for extracting heat energy from said slurry;

holding chamber means for retaining slurry for introduction to said chamber;

means for pumping slurry from said collecting means to said holding chamber means; and means for controlling the spraying of said slurry from said holding chamber means into said chamber.

8. Apparatus as in claim 7 including means for removing a portion of said actinide-sodium slurry for use outside the reactor system.

9. Apparatus as in claim 7 including:

means for withdrawing a portion of said actinide-sodium slurry;

means for extracting actinide containing materials from said slurry; and means for forming said target mass means and said slug means from the extracted actinide containing materials.

10. Apparatus as in claim 9 wherein said forming means includes means for withdrawing a portion of the actinide containing materials from said extraction means and increasing the concentration of fissile materials therein for forming said target mass means and slug means segments of concentrated fissile materials.

11. Apparatus for producing a slurry of alkali metal and actinide materials, said apparatus comprising:

a containing chamber;

less than critical target mass means of fissile and fertile actinides;

less than critical slug means formed of fissile and fertile actinides; means for injecting separately at two different predetermined times said target mass means and said slug means, respectively means for combining pairs of target mass means and slug means seriatim in said containing chamber to produce a more than prompt critical burst; and means for introducing alkali metal containing fluid into said chamber for formation of a slurry with said fissile and fertile actinides.

12. Apparatus as in claim 11 wherein said liquid introducing means comprises:

means for collecting slurry at a bottom portion of said chamber;

heat exchanger means for extracting heat energy from said slurry;

holding chamber means for containing slurry for introducing to said chamber;

means for pumping slurry from said collecting means to said holding chamber means; and means for controlling the spraying of said slurry from said holding chamber means into said chamber.

13. Apparatus as in claim 12 including means for removing a portion of said slurry for use outside the reactor system.

14. Apparatus for the production of useful thermal energy by the consumption of trans-uranic isotopes, said apparatus comprising: a chamber means for dropping seriatim a plurality of target mass means having a less than critical configuration of fissile and fetile actinides;

means for propelling slug means having less than critical configuration of fissile and fertile actinides into said chamber for combining with each of said target mass means such that said actinides become more than prompt critical and produce a burst of energy; means for injecting separately at two different predetermined times said target mass means and said slug means, respectively means for introducing fluid into said chamber for absorbing thermal energy from said burst;

means for collecting said slurry at the bottom portion of said chamber;

heat exchanger means for extracting heat energy from said slurry; and means for directing slurry from said chamber to said heat exchanger means and returning said slurry for reintroduction to said chamber.

* * * * *